(12) United States Patent
Gressel

(10) Patent No.: US 6,311,272 B1
(45) Date of Patent: Oct. 30, 2001

(54) BIOMETRIC SYSTEM AND TECHNIQUES SUITABLE THEREFOR

(75) Inventor: Carmi David Gressel, Mobile Post Negev (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 0 days.

(21) Appl. No.: 09/193,505

(22) Filed: Nov. 17, 1998

(30) Foreign Application Priority Data

Nov. 17, 1997 (IL) ........................................................ 122230

(51) Int. Cl.$^7$ ........................................................ G06F 1/24
(52) U.S. Cl. ........................ 713/186; 713/172; 713/182; 713/18.5; 380/25.5; 380/258
(58) Field of Search .................................. 713/186, 185, 713/182, 172; 380/255, 258

(56) References Cited

U.S. PATENT DOCUMENTS

| | | |
|---|---|---|
| 4,993,068 | 2/1991 | Piosenka et al. . |
| 5,457,747 * | 10/1995 | Drexler et al. ........................ 380/24 |
| 5,465,303 * | 11/1995 | Levison et al. ...................... 382/124 |
| 5,586,171 * | 12/1996 | McAllister et al. .................... 379/67 |
| 5,594,806 * | 1/1997 | Colbert ................................ 382/115 |
| 5,623,547 | 4/1997 | Jones et al. . |
| 5,664,107 | 9/1997 | Chatwani et al. . |

OTHER PUBLICATIONS

Miller, B. "How To Think About Identification", The 1995 Advanced Card and Identification Technology Sourcebook, pp. 17–27, Warfel and Miller Inc., Rockville, 1995.

* cited by examiner

*Primary Examiner*—Thomas R. Peeso
(74) *Attorney, Agent, or Firm*—Merchant & Gould P.C.

(57) ABSTRACT

This invention discloses a biometric method eliciting a migrating biometric characteristic from individuals, the method including storing at least first and second templates of at least one migrating biometric characteristic for each of a population of individuals, the first template being a reference sample of an individual's biometric characteristic and the second template being initially derived from the first template, and comparing an individual's first and second templates to a fresh sample provided by the individual and, if the fresh sample is found to sufficiently resemble the first and second templates, modifying the second template to take into account differences between the reference sample and the fresh sample.

A biometric system eliciting a migrating biometric characteristic from individuals is also disclosed.

15 Claims, 19 Drawing Sheets

SAM - TERMINAL 450  U = USER - SMART CARD 480

CLEAR TEXT REQUEST
TO MAKE ANONYMOUS
TRANSACTION FOR
I'TH PAYMENT SCHEME
←

| SAM 470 GENERATES RANDOM NUMBER CHALLENGE AND TRANSMITS MESSAGE PROVING EXISTENCE OF TERMINAL IN I'TH ACCESS SCHEME | TERMINAL CERTIFICATE (STATIC) → PROVES MEMBERSHIP IN I'TH SCHEME (HIERARCHICAL) + RANDOM CHALLENGE$_T$ + PUBLIC KEY$_T$ + DATE & TIME OF DAY | AUTHENTICATES TERMINAL CERTIFICATE - PUBLIC KEY |

| DECRYPTS CRYPTOGRAM, E.G., $(C_1)^{D_T}$ MOD $N_T$ EXTRICATES DES KEY AND HASH ON $ID_U$, PUBLIC KEY$_U$ AND CHALLENGE$_T$ | $C_1 = E_{T_{RSA}}$ (RANDOM DES KEY(S) + H ($ID_U$ ∥ PUBLIC KEY$_U$ ∥ CHALLENGE$_T$)) ← | GENERATES RANDOM DES KEY AND PREPARES CRYPTOGRAM TO TERMINAL U KNOWS ONLY VALID TERMINAL CAN DECIPHER DES KEY - DES PROTECTS USER CONFIDENTIAL ATTRIBUTES & ANONYMITY ONLY |

| WITH NEW SHARED DES KEY(S) DECRYPTS, $C_2$ = ID, USER'S CERTIFICATE, USER'S PUBLIC KEY. AUTHENTICATES USER'S CERTIFICATE AND CHALLENGE$_T$ | $C_2 = E_{DES}$ ($ID_U$ ∥ USER'S CERTIFICATE ∥ USER'S PUBLIC KEY ∥ [SMALL PURSE BALANCE] ∥ STATUS) ← | SENDS ID INFO ENCRYPTED WITH SHARED DES KEY |

FIG. 6A

SAM - TERMINAL 450　　　　　　　　　　　　　　　　U = USER - SMART CARD 480

CLEAR TEXT REQUEST
　　　　　　　　　　　TO MAKE ANONYMOUS
　　　　　　　　　　　　TRANSACTION FOR
　　　　　　　　　　　　I'TH PAYMENT SCHEME
　　　　　　　　　　　　←─────────────────

| SAM 470 GENERATES RANDOM NUMBER CHALLENGE AND TRANSMITS MESSAGE PROVING EXISTENCE OF TERMINAL IN I'TH ACCESS SCHEME | TERMINAL CERTIFICATE (STATIC) ─────────────────→ PROVES MEMBERSHIP IN I'TH SCHEME (HIERARCHICAL) + RANDOM CHALLENGE$_T$ + PUBLIC KEY$_T$ + DATE & TIME OF DAY | AUTHENTICATES TERMINAL CERTIFICATE - PUBLIC KEY |
|---|---|---|
| DECRYPTS CRYPTOGRAM, E.G., $(C_1)^{DT} MOD N_T$ EXTRICATES DES KEY AND HASH ON $ID_U$, PUBLIC KEY$_U$ AND CHALLENGE$_T$ | $C_1 = E_{T_{RSA}}$ (RANDOM DES KEY(S) + H ($ID_U$ ‖ PUBLIC KEY$_U$ ‖ CHALLENGE$_T$)) ←───────────────── | GENERATES RANDOM DES KEY AND PREPARES CRYPTOGRAM TO TERMINAL U KNOWS ONLY VALID TERMINAL CAN DECIPHER DES KEY - DES PROTECTS USER CONFIDENTIAL ATTRIBUTES & ANONYMITY ONLY |
| WITH NEW SHARED DES KEY(S) DECRYPTS, $C_2$ = ID, USER'S CERTIFICATE, USER'S PUBLIC KEY. AUTHENTICATES USER'S CERTIFICATE AND CHALLENGE$_T$ | ←───────────────── $C_2 = E_{DES}$ ($ID_U$ ‖ USER'S CERTIFICATE ‖ USER'S PUBLIC KEY ‖ [SMALL PURSE BALANCE] ‖ STATUS) | SENDS ID INFO ENCRYPTED WITH SHARED DES KEY |

FIG. 7A

SAM - TERMINAL 450          U = USER - SMART CARD 480

CLEAR TEXT REQUEST
TO MAKE ANONYMOUS
REQUEST FOR
ENTRANCE INTO J'TH GATE
⟵

SAM 470 GENERATES RANDOM NUMBER CHALLENGE AND TRANSMITS MESSAGE PROVING EXISTENCE OF TERMINAL IN I'TH ACCESS SCHEME

TERMINAL CERTIFICATE (STATIC)
⟶
PROVES MEMBERSHIP IN J'TH SCHEME (HIERARCHICAL) + RANDOM CHALLENGE$_T$ + PUBLIC KEY$_T$ + DATE & TIME OF DAY

AUTHENTICATES TERMINAL CERTIFICATE - PUBLIC KEY

DECRYPTS CRYPTOGRAM, E.G., $(C_1)^{DT} MOD N_T$ EXTRICATES DES KEY AND HASH ON ID$_U$, PUBLIC KEY$_U$ AND CHALLENGE$_T$ $C_1 = E_{T_{RSA}}$ (RANDOM DES KEY(S)
+ H (ID$_U$ || PUBLIC KEY$_U$ || CHALLENGE$_T$))
⟵

GENERATES RANDOM DES KEY AND PREPARES CRYPTOGRAM TO TERMINAL
U KNOWS ONLY VALID TERMINAL CAN DECIPHER DES KEY - DES PROTECTS USER CONFIDENTIAL ATTRIBUTES & ANONYMITY ONLY

WITH NEW SHARED DES KEY(S) DECRYPTS, $C_2 =$ ID, USER'S CERTIFICATE, USER'S PUBLIC KEY. AUTHENTICATES USER'S CERTIFICATE AND CHALLENGE$_T$ $C_2 = E_{DES}$ (ID$_U$ || USER'S CERTIFICATE ||
USER'S PUBLIC KEY || [SERIAL # IN SYSTEM || VALID UNTIL || ENTRANCE CONSTRAINTS || PRIORITY])
⟵

SENDS ID INFO ENCRYPTED WITH SHARED DES KEY

FIG. 10A-1

| SAM - TERMINAL 450 | | U = USER - SMART CARD 480 |
|---|---|---|
| | CLEAR TEXT REQUEST TO MAKE ANONYMOUS REQUEST FOR ENTRANCE INTO J'TH GATE ← | |
| SAM 470 GENERATES RANDOM NUMBER CHALLENGE AND TRANSMITS MESSAGE PROVING EXISTENCE OF TERMINAL IN I'TH ACCESS SCHEME | TERMINAL CERTIFICATE (STATIC) →<br>PROVES MEMBERSHIP IN J'TH SCHEME (HIERARCHICAL) + RANDOM CHALLENGE$_T$ + PUBLIC KEY$_T$ + DATE & TIME OF DAY | AUTHENTICATES TERMINAL CERTIFICATE - PUBLIC KEY |
| DECRYPTS CRYPTOGRAM, E.G.,$(C_1)^{DT}$MOD$N_T$ EXTRICATES DES KEY AND HASH ON ID$_U$, PUBLIC KEY$_U$ AND CHALLENGE$_T$ | $C_1 = E_{T_{RSA}}$ (RANDOM DES KEY(S) + H (ID$_U$ ∥ PUBLIC KEY$_U$ ∥ CHALLENGE$_T$)) ← | GENERATES RANDOM DES KEY AND PREPARES CRYPTOGRAM TO TERMINAL U KNOWS ONLY VALID TERMINAL CAN DECIPHER DES KEY - DES PROTECTS USER CONFIDENTIAL ATTRIBUTES & ANONYMITY ONLY |
| WITH NEW SHARED DES KEY(S) DECRYPTS, $C_2$ = ID, USER'S CERTIFICATE, USER'S PUBLIC KEY. AUTHENTICATES USER'S CERTIFICATE AND CHALLENGE$_T$ | $C_2 = E_{DES}$(ID$_U$ ∥ USER'S CERTIFICATE ∥ USER'S PUBLIC KEY ∥ [SERIAL # IN SYSTEM ∥ VALID UNTIL ∥ ENTRANCE CONSTRAINTS ∥ PRIORITY) ← | SENDS ID INFO ENCRYPTED WITH SHARED DES KEY |

FIG. 10B-1

| [RECEIVES PIN] [RECEIVES BIOTEST] ASSEMBLES DES AGREEMENT MESSAGE ($C_3$) WHICH INCLUDES [PIN], [BIOTEST] AND AGREEMENT INDEX & SAM ID | $C_3 = E_{DES}$ ([PIN] \|\| [BIOTEST] \|\| AGREEMENT INDEX) $\longrightarrow$ $C_4 = E_{DES}$ (ENTRANCE COMMITMENT) $\longleftarrow$ | DECRYPTS PIN + BIOTEST ACTIVATES TRANSACTION CHECKS PIN, DETERMINES PROXIMITY TO ORIGINAL REFERENCE TEMPLATE, REVISED REFERENCE TEMPLATE AND/OR LAST UPDATE TEMPLATE. REJECTS OR ACCEPTS AND UPDATES LAST TEMPLATE |
|---|---|---|
| AUTHENTICATES MESSAGE ARCHIVES IN CLEAR { DATE & TIME \|\| SIGNATURE \|\| ID \|\| PIN, NAME} | $S_{U_{RSA}}$ (HASH (ENTRANCE COMMITMENT INDEX \|\| [PIN] \|\| [BIOTEST] )) $\longleftarrow$ | ENCRYPTS AND SIGNS ENTRANCE COMMITMENT |
| SENDS SIGNAL TO OPEN GATE/ REFUSES ENTRY. CLOSES TRANSACTION. | ACKNOWLEDGES/REFUSES $\longrightarrow$ | CLOSES TRANSACTION |

FIG. 10B-2

BIOMETRIC SYSTEM AND TECHNIQUES SUITABLE THEREFOR

FIELD OF THE INVENTION

The present invention relates to biometric devices generally.

BACKGROUND OF THE INVENTION

Biometric technology is discussed in B. Miller, "How to think about identification", *The* 1995 *Advanced Card and Identification Technology Sourcebook*, Warfel and Miller Inc., Rockville, Md., 1995.

A state of the art value transfer system is described in U.S. Pat. No. 5,623,547 to Jones et al.

The disclosures of all publications mentioned in the specification and of the publications cited therein are hereby incorporated by reference.

SUMMARY OF THE INVENTION

The present invention seeks to provide an improved biometric system and methods useful in implementing such a system.

There is thus provided in accordance with a preferred embodiment of the present invention a secured biometric system including a portable secured biometric information receptacle storing biometric information regarding an individual and a terminal which does not store the biometric information and which is operative to compare the biometric information on the biometric information receptacle to biometric information obtained directly from the human bearer of the biometric information receptacle.

Also provided, in accordance with another preferred embodiment of the present invention, is a biometric system eliciting a migrating biometric characteristic from individuals, the system including a biometric information repository storing at least first and second templates of at least one migrating biometric characteristic for each of a population of individuals, the first template being a reference sample of an individual's biometric characteristic and the second template being initially derived from the first template, a repository keeper operative to compare an individual's first and second templates to a fresh sample provided by the individual and, if the fresh sample is found to sufficiently resemble the first and second templates, to modify the second template to take into account differences between the reference sample and the fresh sample.

Also provided, in accordance with another preferred embodiment of the present invention, is a secured biometric device eliciting a biometric characteristic from individuals, the system including a biometric information repository storing a biometric information file for each of a population of individuals, each biometric information file of a particular individual including a representation of a sample of at least one biometric characteristic, and enrollment operator identification information identifying the enrollment operator who presided over elicitation of the sample from the individual.

Also provided, in accordance with another preferred embodiment of the present invention, is a secured biometric system eliciting a biometric characteristic from individuals, the system including a secure enrollment unit operative to enroll individuals by eliciting a reference biometric characteristic sample therefrom, a secure access control unit operative to validate an enrolled individual by eliciting a fresh biometric characteristic sample therefrom and comparing the fresh and reference samples; and a security subsystem protecting the biometric characteristic samples from rogues.

Also provided, in accordance with another preferred embodiment of the present invention, is a digital decision making system including a portable digital information receptacle; and an information receptacle terminal operative to carry out an interaction with the portable digital information receptacle and to make a decision based on the interaction, wherein the interaction includes a clear portion and a protected portion and wherein the clear portion includes only a declaration on the part of the terminal of its identity.

Further in accordance with a preferred embodiment of the present invention, the protected portion includes a publicly known identity of the portable digital information receptacle.

Still further in accordance with a preferred embodiment of the present invention, information receptacle includes a smart card.

Additionally in accordance with a preferred embodiment of the present invention, the protected portion includes a transfer of value from an account controlled by the information receptacle to a value destination, the transfer including a commitment of the information receptacle to the terminal that the value is to be transferred to the value destination.

Further in accordance with a preferred embodiment of the present invention, the protected portion is protected by a symmetric cryptographic scheme and an asymmetric cryptographic scheme.

Still further in accordance with a preferred embodiment of the present invention, the biometric characteristic includes at least one of the following: an item of information known to an individual; an article possessed by an individual; and a physiological feature of an individual.

Conventionally, operators of biometric devices and individuals subjected thereto do not regard biometric characteristics as confidential information and therefore, conventional biometric devices typically do not include security. A particular feature of a preferred embodiment of the present invention is that biometric features are regarded as excellent criteria for identifying individuals, if and only if suitable security is provided each time biometric features are elicited or used to provide access control.

The term "smart card" is used herein as an example and it is appreciated that alternatively, any portable information receptacle may be used.

BRIEF DESCRIPTION OF THE DRAWINGS

The present invention will be understood and appreciated from the following detailed description, taken in conjunction with the drawings in which:

FIGS. 10A and 10B depict negotiations between a public key protected smart card terminal 450 and a smart card, wherein the goal is to gain access to a protected environment, e.g. a gate to a facility or a computer procedure.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1A:
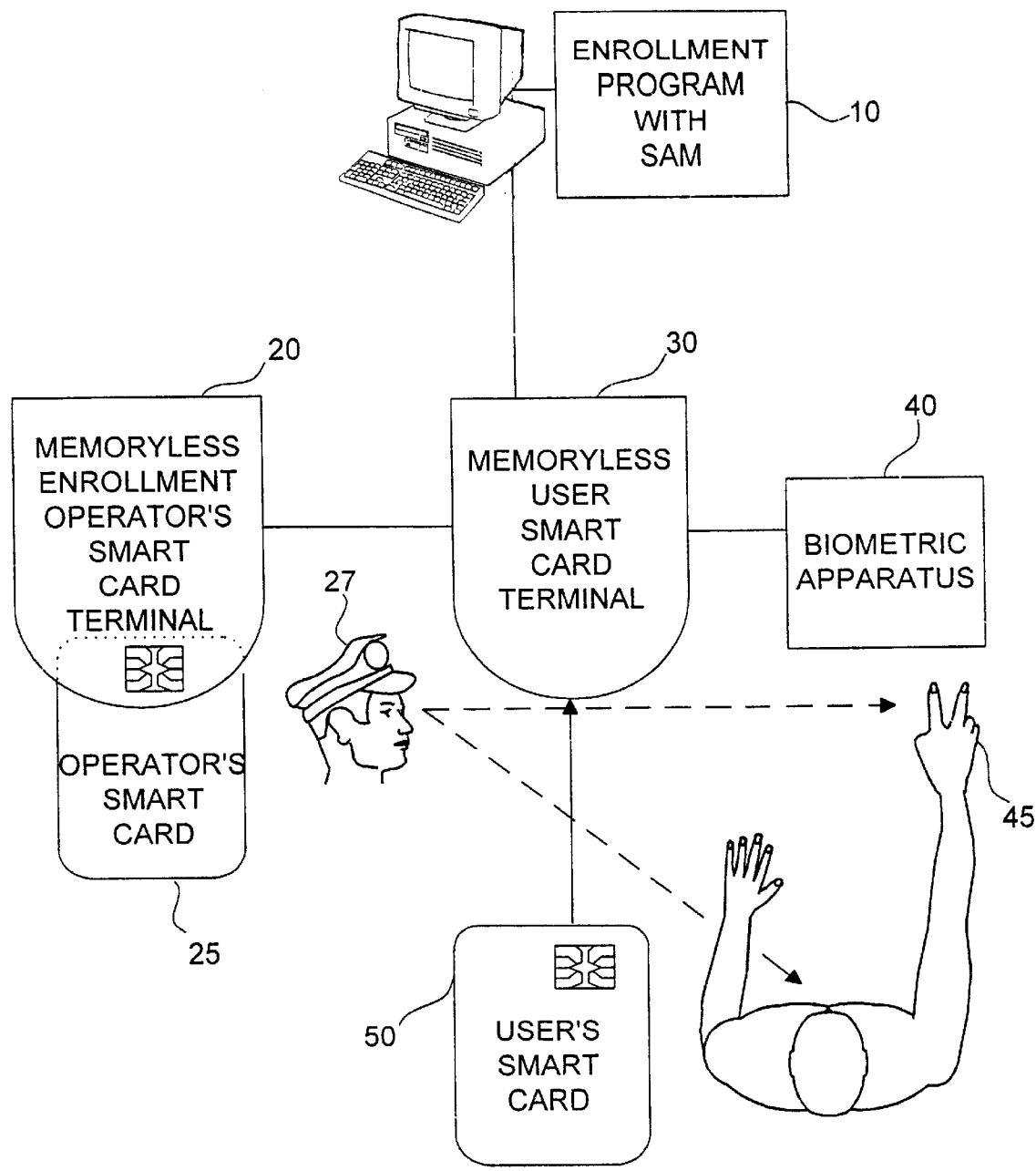
FIG. 1A is a simplified block diagram of a secured biometric enrollment system constructed and operative in accordance with a preferred embodiment of the present invention.

Reference is now made to FIG. 1A which is a simplified block diagram of a secured biometric enrollment system constructed and operative in accordance with a preferred embodiment of the present invention.

The system of FIG. 1A includes an enrollment program 10 residing in a SAM (security application module). A memoryless enrollment operator's smart card terminal 20 is provided which receives a smart card 25 presented by a enrollment operator 27. The smart card 25 stores biometric information identifying the enrollment operator 27. The biometric information stored on the card 25 is compared, preferably by the smart card 25 itself, to a fresh sample of biometric information. The fresh sample is measured by biometric apparatus 40 and provided to the smart card 25. The output of the comparison process is a decision whether or not the enrollment operator 27 is legitimate. If it is legitimate, the smart card commits to the terminal 20 that the officer 27 is in attendance and is responsible for measurements made by the biometric apparatus 40 for as long as the smart card 25 is inserted in the card slot of terminal 20.

The system is now ready to enroll users, including maintaining a record of enrolled users allowing enrolled users to be individually recognized and therefore to be distinguished from each other and from non-enrolled individuals.

A user (smart card bearer) 45 presents herself to the system and inserts her smart card into a user's terminal 30.

The terminal elicits from the smart card an identity of the valid user of that smart card and provides a display to the operator identifying that valid user. The operator ascertains that the user bearing the smart card is the very same "valid user" whose identity is stored in the smart card. The operator's identification may be carried out by any suitable means such as inspection of physical documents or visually comparing the smart card bearer's appearance to a photograph of the valid user which is already possessed by the system e.g. which is included in the smart card.

Assuming that the smart card bearer has been identified as the valid user of the smart card, the operator allows the user to interact with biometric apparatus 40 such as but not limited to an optical finger geometry measuring device. The biometric apparatus 40 provides a biometric measurement characterizing the user to the memoryless user smart card terminal 30. The user is now enrolled in the system.

The smart card terminals are both memoryless with respect to the biometric data, in the sense that they include only volatile memory for storing the biometric data such that, for security reasons, the biometric data read by the terminals never resides in non-volatile memory. The smart card terminals 20 and 30 each typically include a SAM such as a CF54A by SGS-Thomson, in which all confidential functions are performed.

Alternatively, the smart card terminals are not memoryless and instead, they include an encrypted biometric data archive, e.g. an archive based on public key cryptography.

Figure 1B:
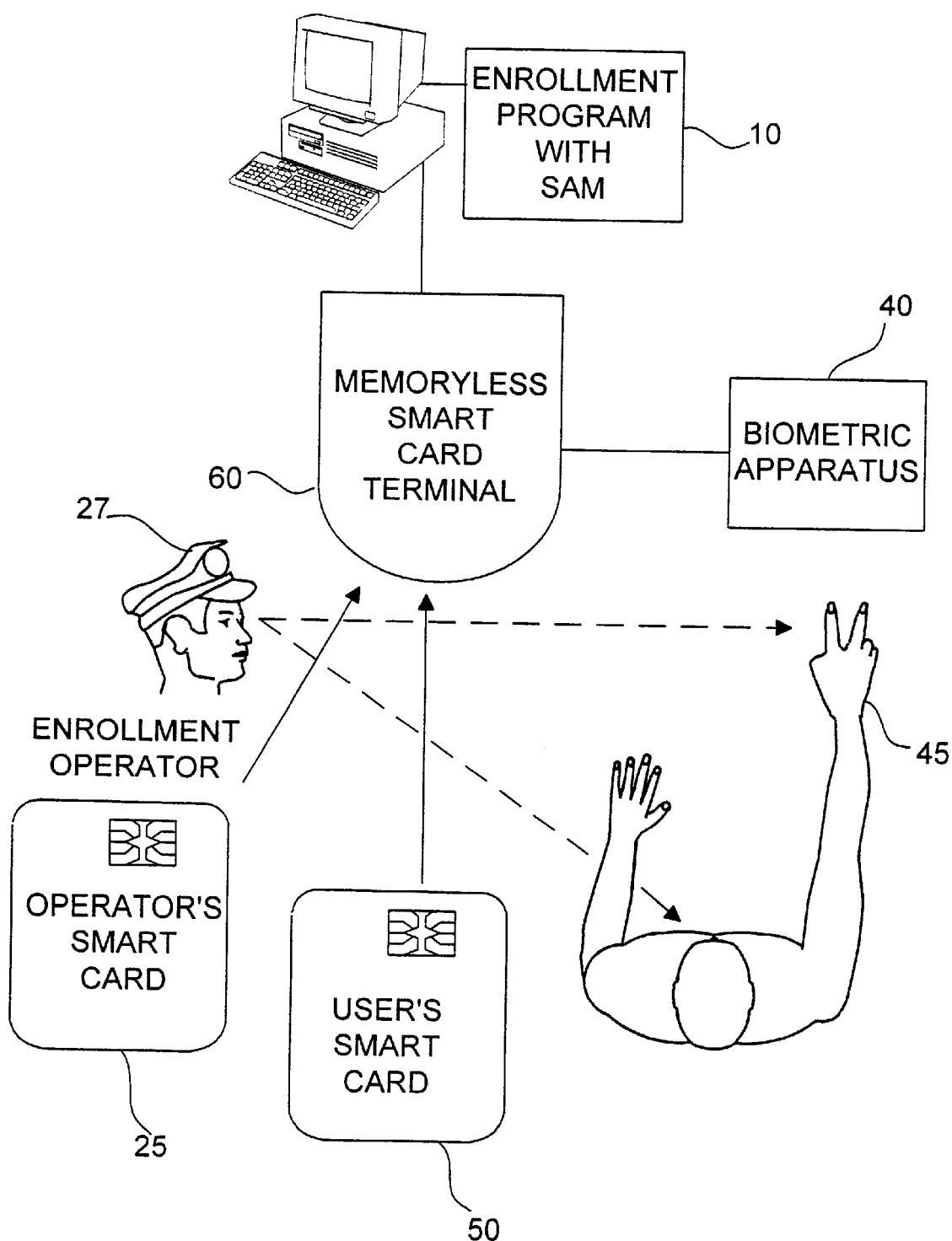
FIG. 1B is a simplified block diagram of a secured biometric enrollment system constructed and operative in accordance with a preferred embodiment of the present invention in which the enrollment operator is not provided with her own smart card terminal.

FIG. 1B is a simplified block diagram of a secured biometric enrollment system constructed and operative in accordance with a preferred embodiment of the present invention in which the enrollment operator is not provided with his own smart card terminal. Therefore, the enrollment operator's card is not inserted throughout the user enrollments over which he presides but rather is typically inserted only once or periodically or upon system demand and, once validated, is removed to allow the user's smart card to be inserted for enrollment purposes.

Figure 2A:
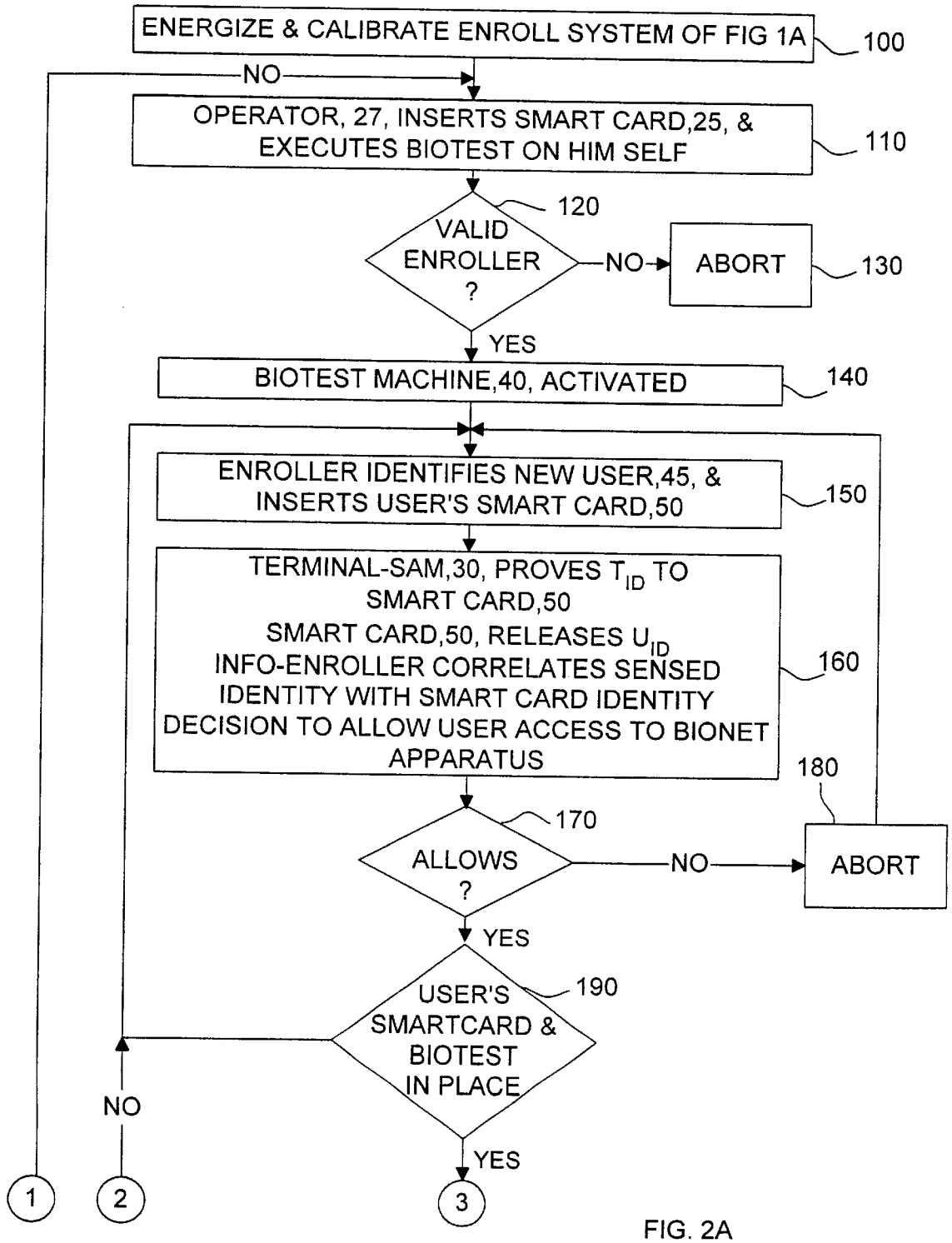
FIGS. 2A–2B, taken together, form a simplified flowchart illustration of a preferred method of operation for the enrollment system of FIG. 1A.
Figure 2B:
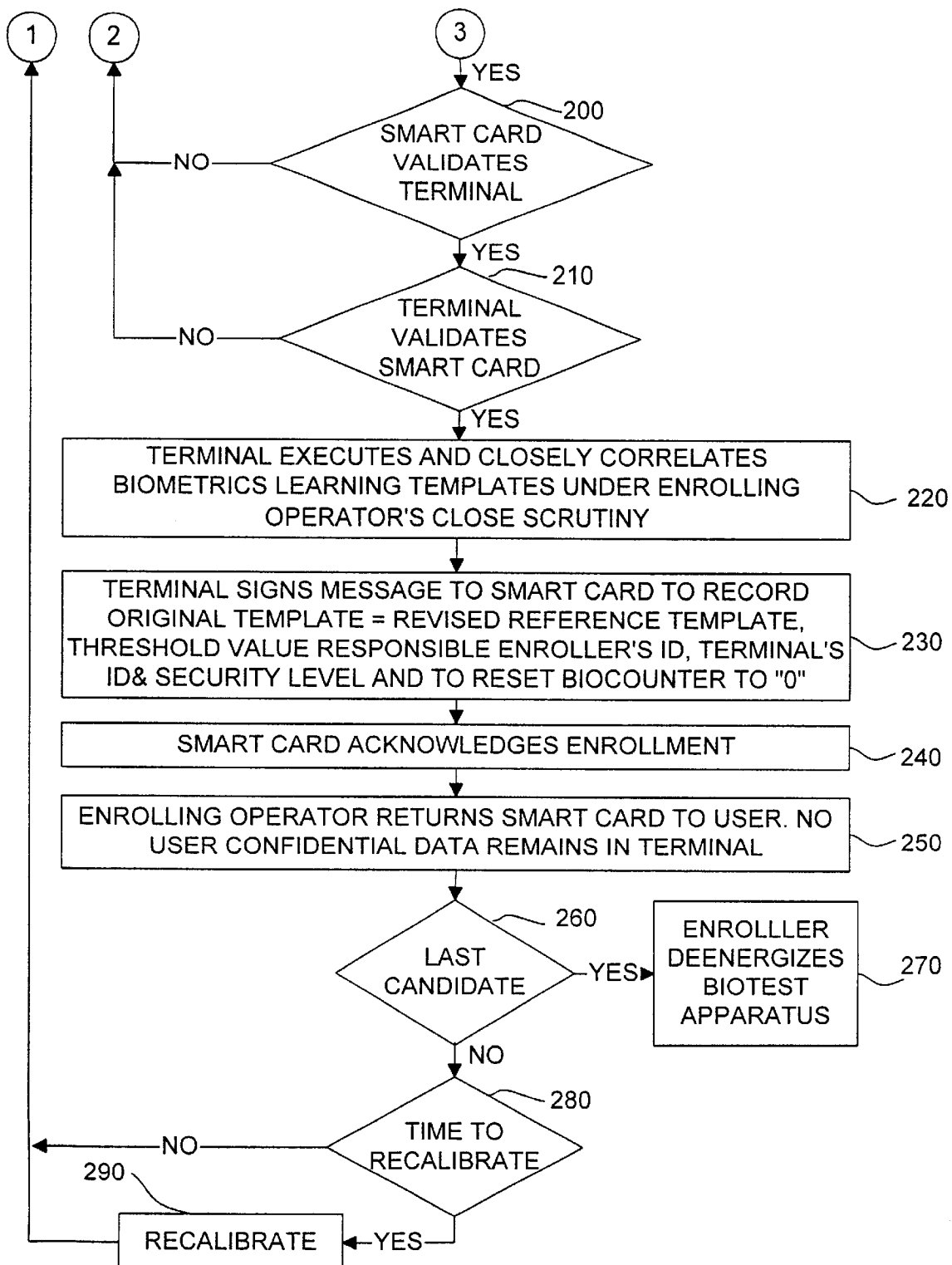

FIGS. 2A–2B, taken together, form a simplified flowchart illustration of a preferred method of operation for the enrollment system of FIG. 1A.

Figure 3:
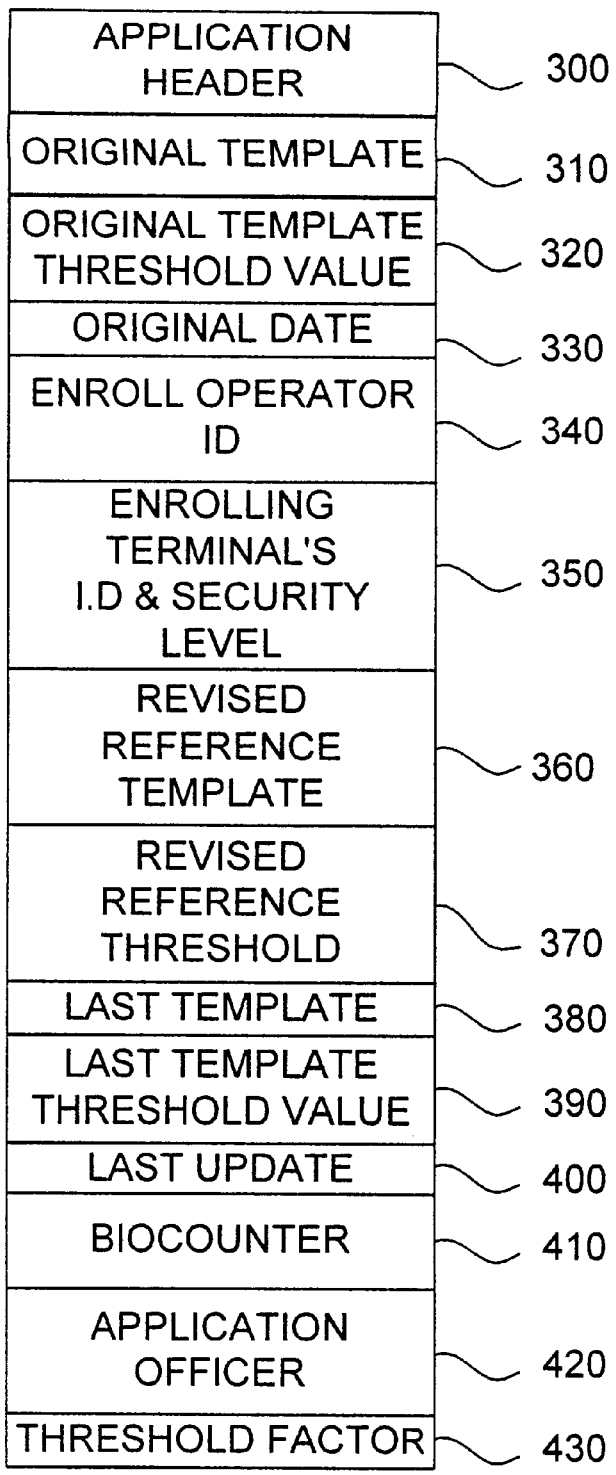
FIG. 3 is simplified conceptual illustration of an enrollment record upon completion of the method of FIGS. 2A–2B.

FIG. 3 is simplified conceptual illustration of an enrollment record upon completion of the method of FIGS. 2A–2B. Typically, only certain entities are entitled to issue a command to a portable information receptacle to write each of the fields in the enrollment record. Preferably, write entitlement is as follows:

Application issuer (e.g. system operator): Application header 300, original template threshold value 320, revised reference threshold (optional) 370, last template threshold value 390.

Enrolling terminal, activated by enrollment operators: original template 310, original date 330 and enroll operator ID 340, enrolling terminal's ID and security level 350;

Smart card application: Revised reference template 360, last template 380, last update 400, biocounter 410.

Application officer, e.g. physician: Application officer ID 420, threshold factor 430.

Figure 4:
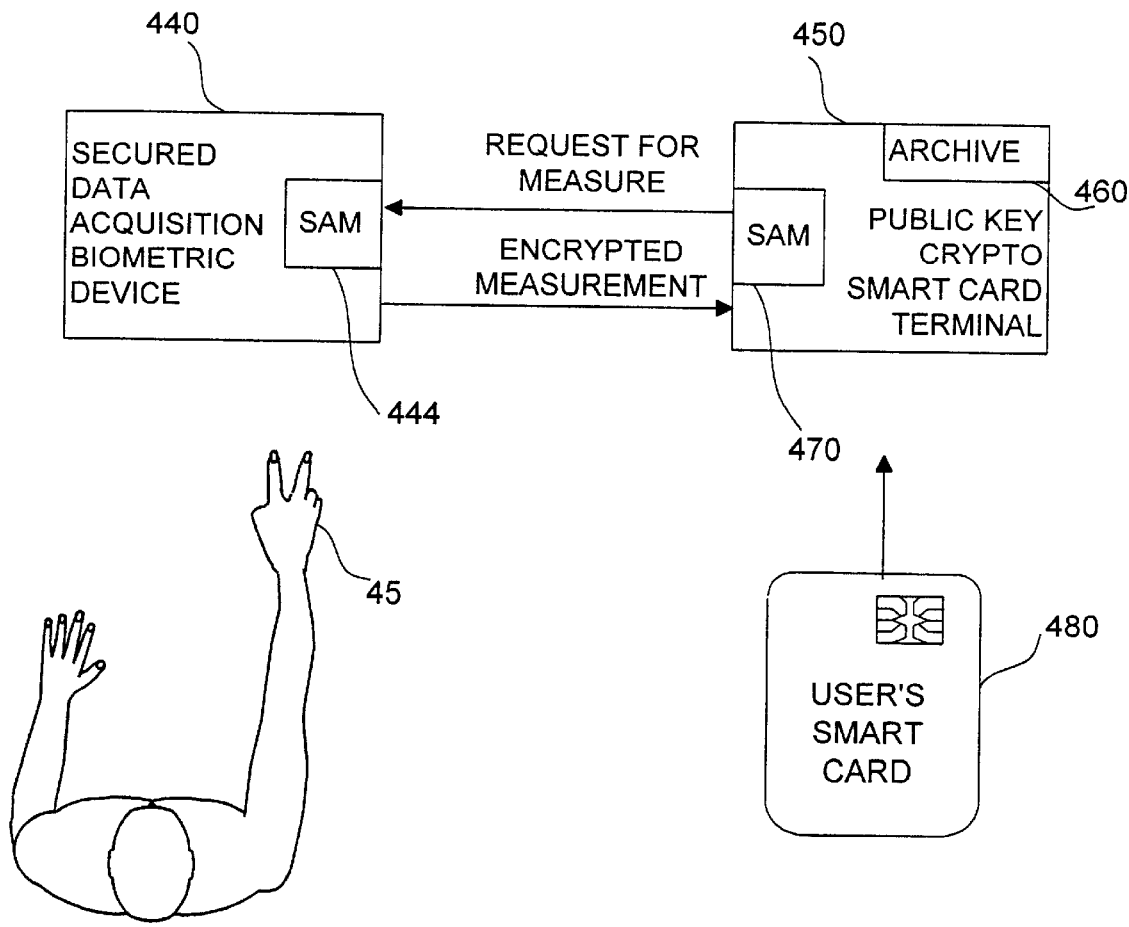
FIG. 4 is a simplified block diagram of a secured biometric access control system constructed and operative in accordance with a preferred embodiment of the present invention.

FIG. 4 is a simplified block diagram of a secured biometric access control system constructed and operative in accordance with a preferred embodiment of the present invention. The system of FIG. 4 is useful in enabling enrolled users to perform certain actions in a controlled manner. The system of FIG. 4 comprises a biometric device 440 and a smart card terminal 450 which are preferably integrally formed. The smart card terminal 450 enables enrolled users to perform financial transactions and/or to gain physical access to restricted locations and/or to perform any suitable action in a controlled manner. The smart card terminal 450 typically includes a SAM 470 and an archive 460 which is typically external to the SAM.

Typically the biometric device 440 and the terminal 450 include separate SAMs, 444 and 470.

Figure 5A:
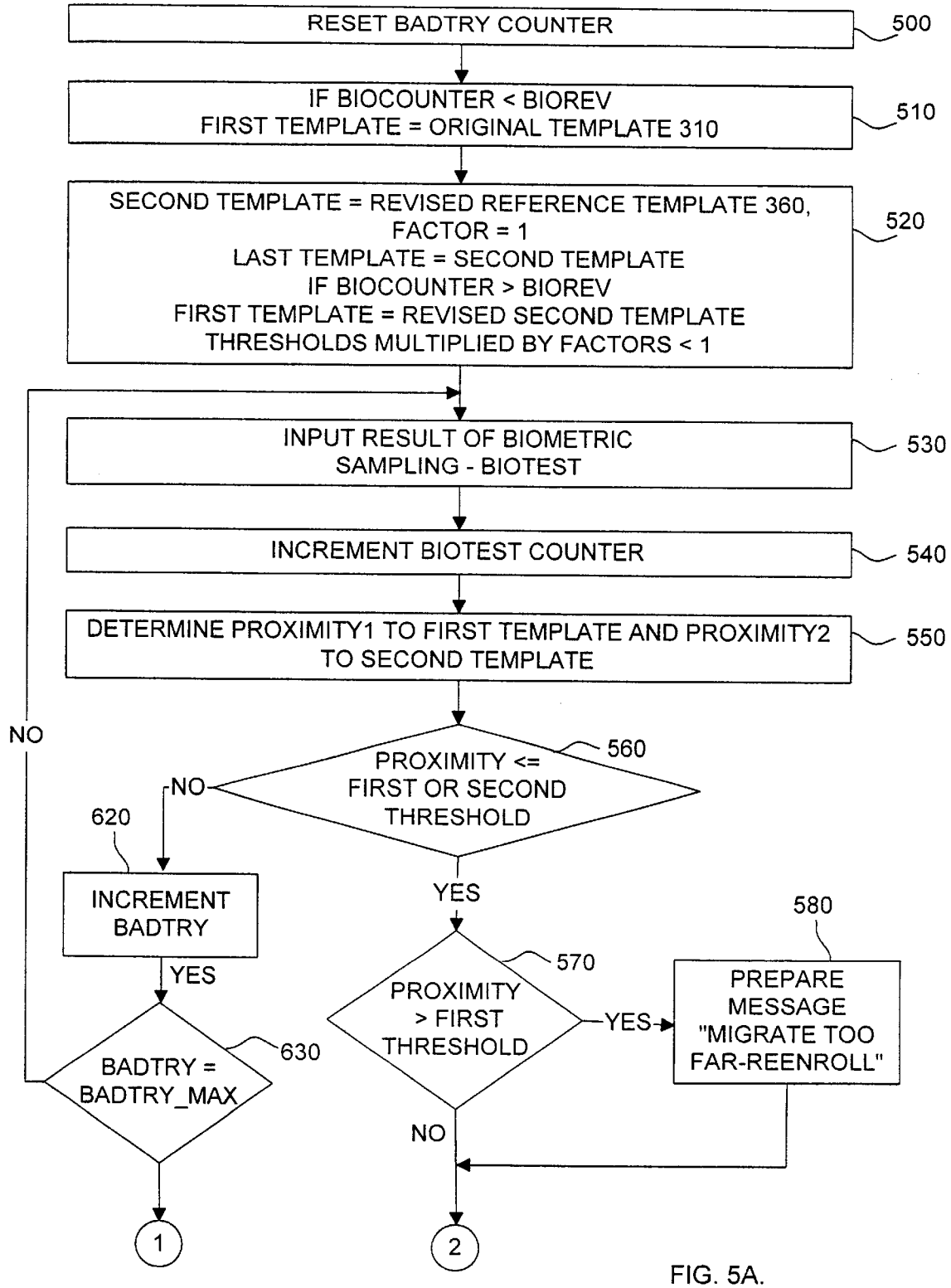
FIGS. 5A–5B, taken together, form a simplified flowchart illustration of a preferred method of operation for the access control system of FIG. 4.
Figure 5B:
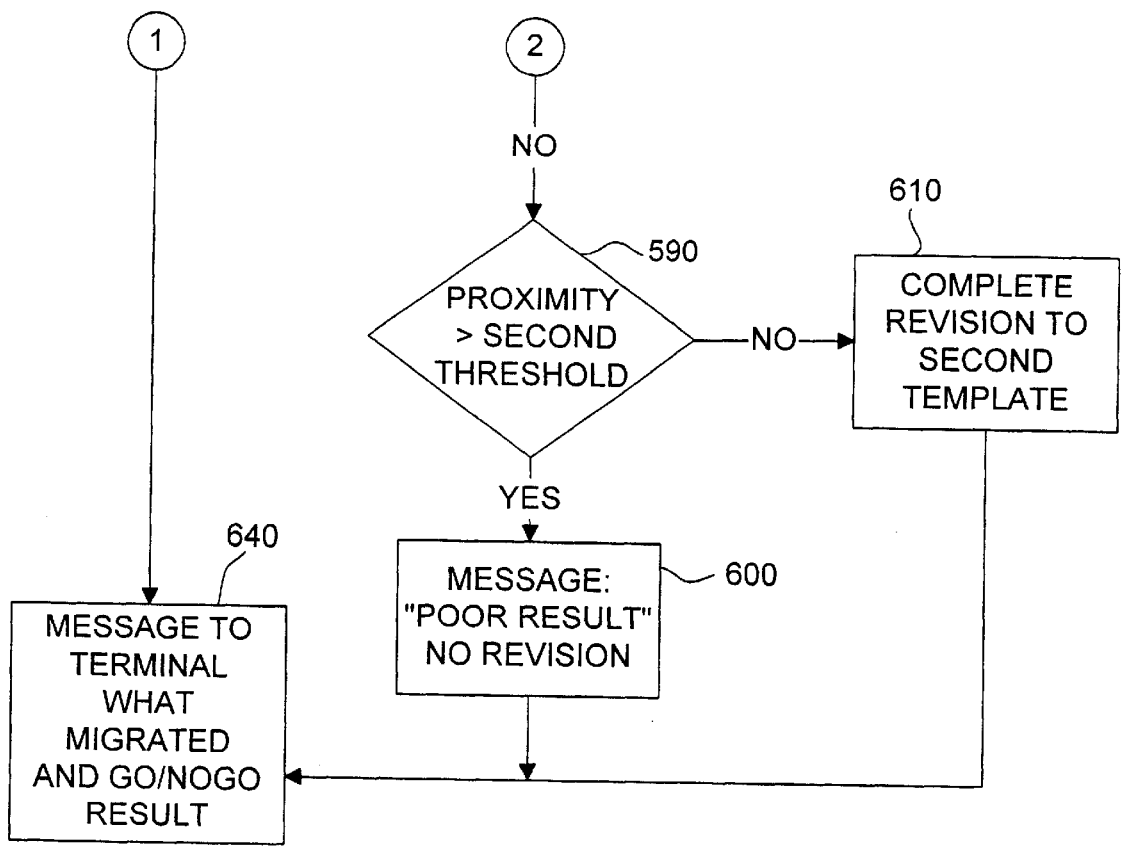

FIGS. 5A–5B, taken together, form a simplified flowchart illustration of a preferred method for comparing a fresh biometric sample to one or more reference biometric samples. More than one reference sample is typically stored if the biometric characteristic is known to migrate. Preferably two reference samples are provided, one being the original measurement and the other being a migrated measurement reflecting the biometric characteristic as most recently sampled. The method of FIGS. 5A–5B typically determines that the fresh biometric sample has been taken from the same individual as the reference samples, using a suitable threshold such as one which is close to the crossover of the FAR and FRR curves in FIG. 9A. Then, the method of FIGS. 5A–5B preferably updates the second of the two reference samples based on the fresh sample. Typically the second reference sample is not replaced by the fresh sample but rather is modified to compensate for changes. For example, if there is a 3 valued reference template A (25, 75, 45) and a sampled vector B: (35, 65, 50) and the method of compensation is to multiply members of the previous A vector by 0.8 and multiply the members of the B vector by 0.2 and then to sum the corresponding vectors, the revised new reference template is:

(0.8 25+0.2×35, 0.8×75+0.2×65, 0.8×45+0.2×50)==(27,73,46).

The method of FIGS. 5A–5B is preferably performed by smart card 480 or alternatively elsewhere such as in terminal 460.

FIG. 6 is a simplified sequence-of-events illustration of a preferred method of operation for the access control system of FIG. 4 when encountering a user whose identity can be verified, wherein the confidential information in the archive of the terminal of FIG. 4 is encrypted to an acquirer. The acquirer is typically an entity who processes transactions. For example, in banking applications, the acquirer may be a Giro, i.e. an automated service for providing payment reconciliation by transferring value between financial entities to reflect an algebraic sum of transactions between them. In physical access control applications, the acquirer typically comprises an automatic entry recording device which records individuals passing through an access control point.

Figure 7B:
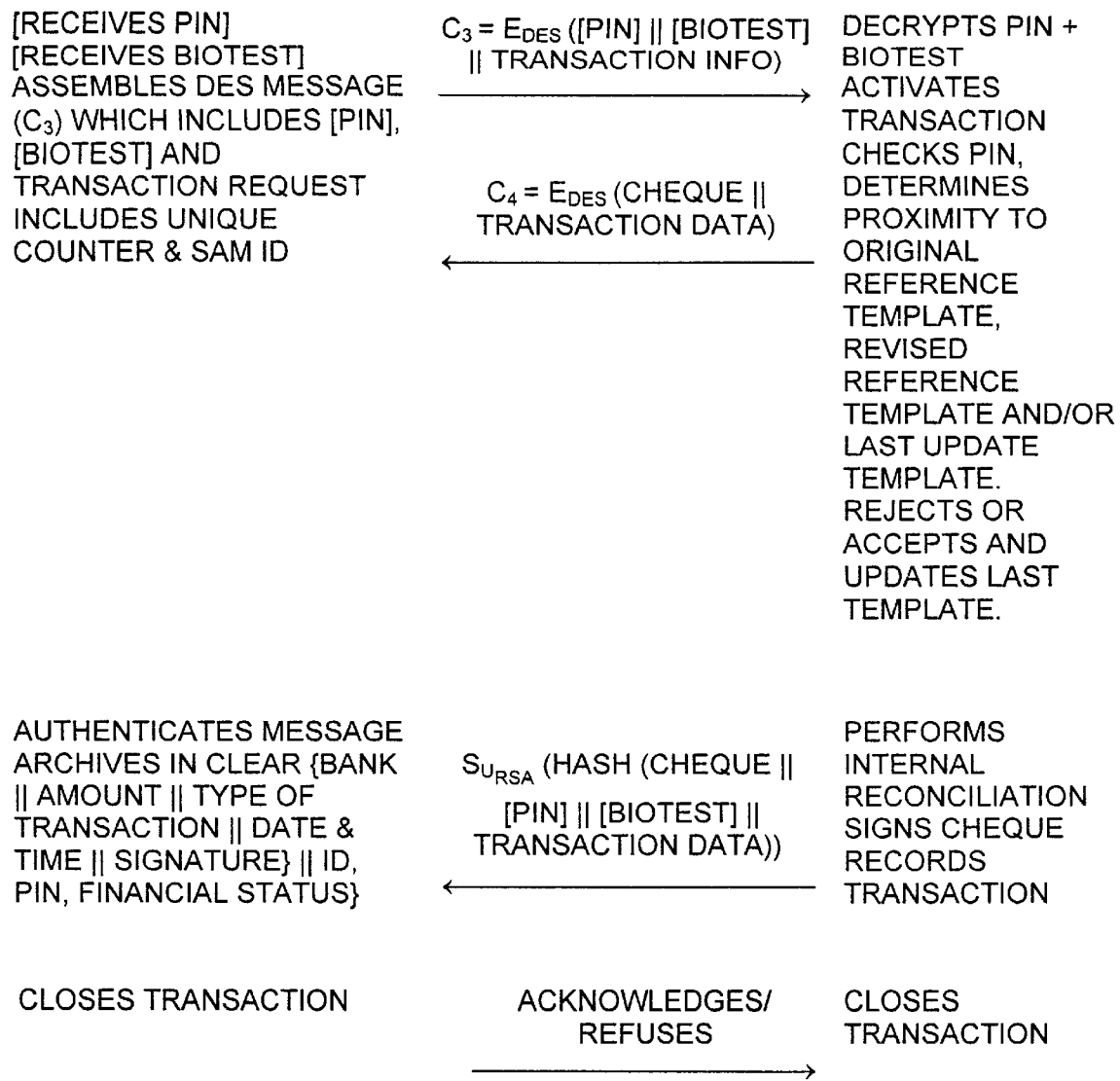
FIG. 7 is a simplified sequence-of-events illustration of a preferred method of operation for the access control system of FIG. 4.

FIG. 7 is a simplified sequence-of-events illustration of a preferred method of operation for the access control system of FIG. 4 when encountering a user whose identity can be verified, wherein the confidential information in the archive of the terminal of FIG. 4 is stored in the clear, i.e. its confidentiality is not maintained.

Figure 8A:
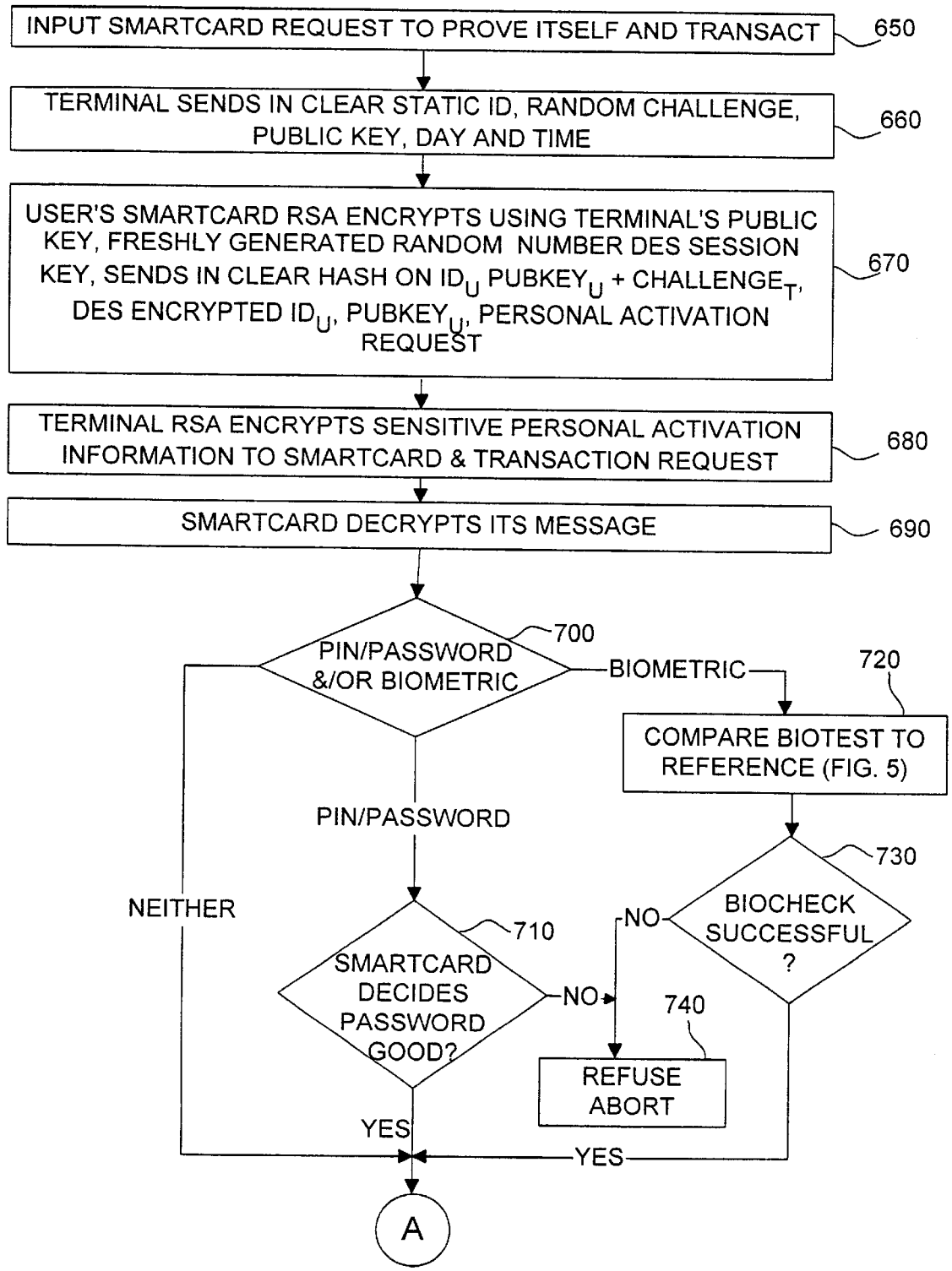
FIGS. 8A–8B, taken together, form a simplified flowchart illustration of a preferred method of operation for the system of FIG. 4 which is generally similar to the method described with reference to FIG. 6.
Figure 8B:
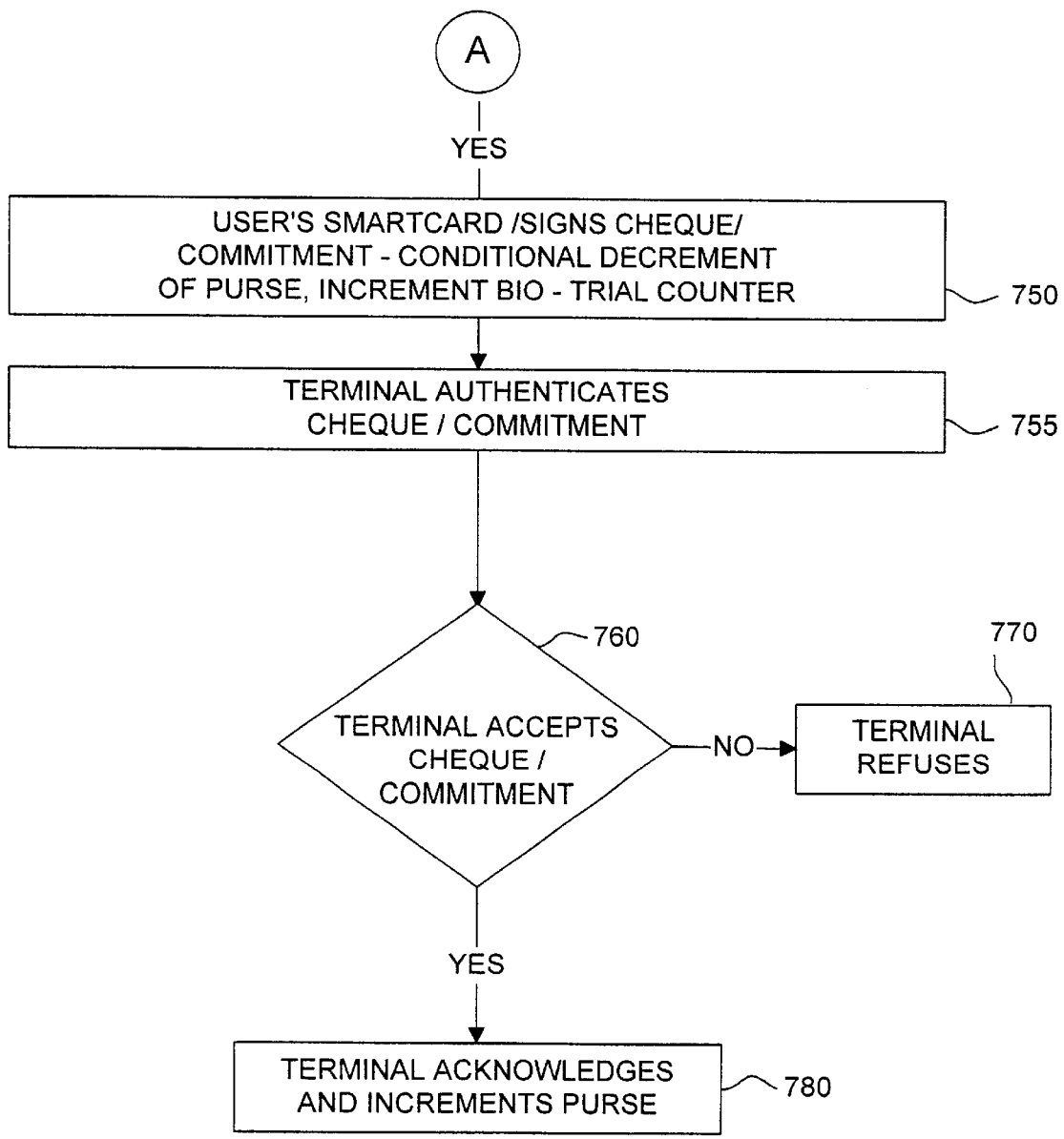

FIGS. 8A–8B, taken together, form a simplified flowchart illustration of a preferred method of operation for the system of FIG. 4 which is generally similar to the method described with reference to FIG. 6. Typically, if the biometric measurement under consideration includes both PIN/password and biometric (step 710) then two branches of the flowchart are performed: both the branch starting from step 720 and the branch starting from step 710. A preferred method for performing the biometric processing step 720 is the method described above with reference to FIGS. 5A–5B.

Figure 9A:
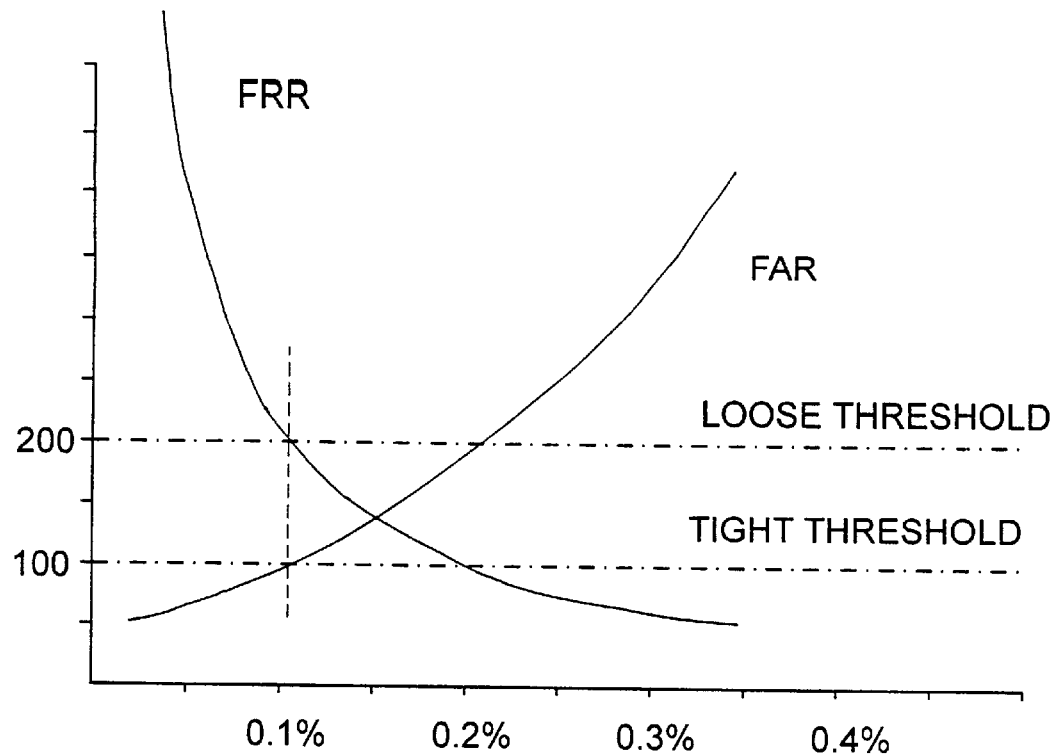
FIG. 9A is a graph of the false rejection and false acceptance rates of a biometric device for measuring hand or finger geometry (percentage of false rejects and false acceptances as a function of threshold)

FIG. 9A is a graph of the false rejection and false acceptance rates of a biometric device for measuring hand or finger geometry (percentage of false rejects and false acceptances as a function of threshold).

Figure 9B:
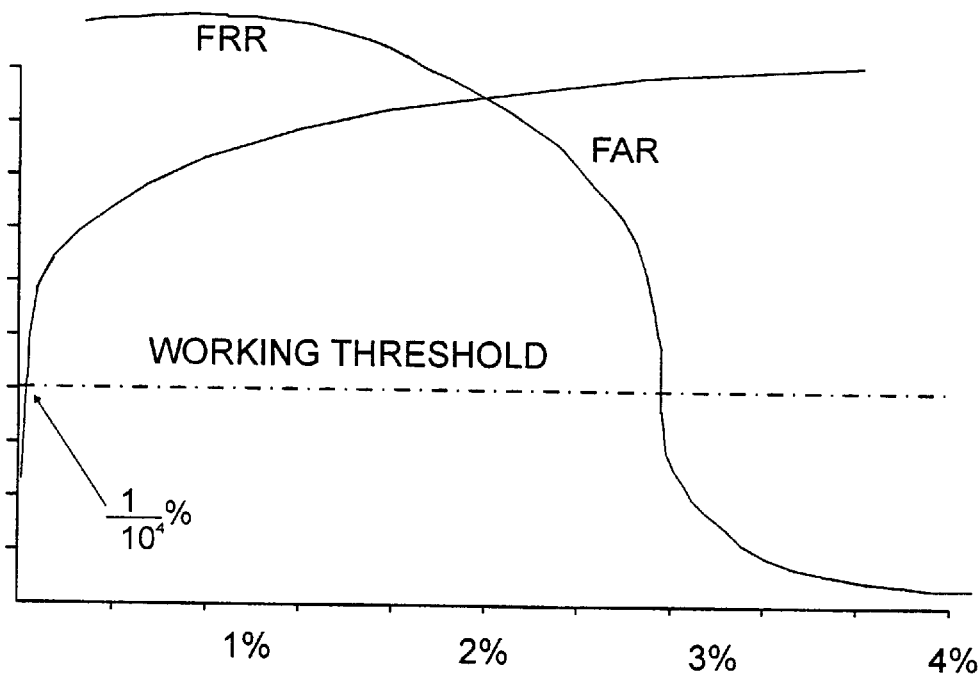
FIG. 9B is a graph of the false rejection and false acceptance rates of a biometric fingerprint scanning device.

FIG. 9B is a graph of the false rejection and false acceptance rates of a biometric fingerprint scanning device.

A particular advantage of the preferred embodiment of the present invention described herein is the enhancement of confidentiality, security and authenticity in biometric identity and other identity systems.

Identifying humans is increasingly becoming a function necessary for controlling access to computers, homes, offices, or sensitive facilities, and for establishing a provable relationship between a person and certain information, for use in payment systems, visa and passport systems, health files, etc.

Biometric technologies are described in Miller, B, "How to Think About Identification", *The 1995 Advanced Card and Identification Technology Sourcebook*, pp. 17–27, Warfel and Miller Inc., Rockville, Md., 1995, hereinafter referred to as "Miller". Miller describes these technologies as those automated methods of identifying a human being based on physiological or behavioral characteristics.

In large scale systems, such identification cannot be handled efficiently and securely depending on personal recognition e.g., a security guard at the entrance of large bank who recognizes all of the institution's clients. Additional methods of identity which allow for automatic machine classification at varying levels of security are necessary.

Miller wrote that all such identification processes can be constrained into a model using a single or a combination of three basic building blocks. A person can be identified by something s/he knows, e.g., a personal identification number (PIN); something a person possesses, e.g., a passport or driver's license, a credit card; and/or something about such a person, e.g., a signature or the manner of making such a signature; a fingerprint; the unique hand or finger geometry; the person's voice or manner of speech, or the person's facial features.

As such information is most often used in an open communication system, where an intruder, a friend or a disgruntled employee may have access to the transmitted information, it is increasingly possible for such a system adversary to record and reuse such data to impersonate another person with the intention of violating a set of system access rules. Examples are innumerable, e.g., a child using a parent's credit card to purchase cigarettes from a vending machine, programmed only to legally vend tobacco to adults; a criminally hidden camera viewing a credit card holder keying in his secret code number into an Automated Teller Machine (ATM). Knowing the easily duplicated data on the victim's magnetic stripe credit card, an impostor is now equipped to use either an improperly obtained or a forged credit card to gain access to another party's credit line.

In many instances, such identifying data is not, or should not be in the public domain, e.g., a person's PIN code, an accurate template of his fingerprint, or his hand or finger geometry, especially if this information is formatted in a standard method which can benefit an impostor. In such instances, where such data is in the public domain, the system operator preferably declares clearly what data is stored, allowing the system user the opportunity to find another personal attribute for confidential identification.

For example, a recreational park maintains a central data base of finger geometry of present and previous holders of access passes to the recreation park's facilities, where millions of samples of such information are held. Measured data is broadcast over the park's communication network, to be authenticated against the central data base's records, to ascertain whether the person requesting entry is the rightful holder of a period pass. If a user's bank were to use the same biometric attributes in lieu of a PIN number, a user typically uses one hand, e.g., the left fore and index fingers, for his confidential identification at an ATM machine, and the other hand, for use in a situation where such data is not stored in a sufficiently confidential way, or one that would pose a potential danger to the rightful user. A particular feature of a preferred embodiment of the present invention is that confidential data is kept in an inviolate environment, and another intention is to protect such data in inviolate environments and a third to provide for safekeeping in less guarded databases against misuse by encrypting to a trusted agent, who may gain access to information, if and only if due legal process has been provided.

Biometric data is further classified as potentially confidential or unconfidential, where the citizen has a clear option as to whether his data can be non-violate, to the point where should he not be physically forced to submit to measurement, this information can be maintained in a reasonably confidential manner. Examples of potential non-confidential biometric data are passport pictures, fingerprints, which can be copied from an ordinary drinking glass, signature accelo-rhythm or typing characteristic rhythmic data, voice attributes, etc. all of which can be collected without the user's knowledge.

The methods of this invention can be used for linking, protecting, and keeping confidential all of these identifying biometric attributes, where in preferred implementations, the identification process includes one or more biometric measure which can define a single human with a high level of security. Generally a sampled test of biometric features is termed herein a biotest. The reference data against which this biotest is compared is termed a "test vector", a "test matrix", a "template", a "feature template", or a "reference template".

As a further division, some of these features can be classified as relatively invariant, such as metrics related to iris scans, retina scans, DNA and the minutiae of finger prints.

Other biometric characteristics, are variable and migrate, oscillate or undergo other changes caused by age, infirmity, or personal fluctuations. These changes are measured in hand and finger geometry scanners, or are dynamically analyzed on-line by computers e.g., the rhythms of a typist's keystroke, the dynamics of signatures, where the rhythms, accelerations, and pressures exerted by a signer are measured; or changes which are noticed in voice, speech, or body geometry. The migrating parameters are best recognized in a system which is in constant use, but are preferably compensated for, either in less tight thresholds of acceptance and or rejection, or in careful updating of a reference template. Another intention of this patent is to show methods for compensating changes of such data, relating to migrating of measured data as a result of age, infirmity, or normal oscillations in personal biological patterns.

Many methods for storing such biometric data are used, and in many cases may be corrupted intentionally by operators, or degenerated by faulty memory devices. Another intention of this patent is to develop the tools to establish such biometric data in a secured environment, on the assumption that it was collected responsibly, and that there was neither intentional or unintentional leakage of such confidential data.

In two preferred embodiments, examples are shown how such data can be stored in a public key protected smart card, and utilized in such a way so that an inimical probe would be virtually unable to learn the identifyee's unique personal data or his publicly known identity, e.g., his name, ID number, etc. In both of these preferred embodiments the confidential data is processed in an inviolate environment. This method is especially suited to payment schemes, wherein a maximum degree of anonymity is desirable in certain environments; e.g., vending machine purchases of health or personal hygiene products.

Using the method of FIG. 6, any confidential data processed in the Terminal Secured Application Module (SAM) does not appear in the clear on the smart card interface; however, it or all of it, can alternatively be archived in the clear or encrypted into the terminal's unprotected memory.

In all instances, as per the methods of FIG. 6, where confidential biometrics, such as finger scans, retina scans, passwords or secret identification numbers are stored, the comparison to a template is preferably executed in the individual smart card, and revisions to a template are typically executed within the smart card, or alternately in a cryptographically linked SAM. Alternately, such data can be encrypted using a shared secret system key, and stored in a portable memory device carried by the user. In such an instance, all risk management is preferably managed in the smart card terminal's SAM. The relative weakness of such a system is that all terminals have system keys. This system fault can be alleviated by downloading keys for limited use, using public key exchange procedures.

Smart cards or other portable electronically protected security devices are used to protect information and establish identity and responsibility of system users and operators. New public key protected smart cards have the additional attribute of developing a secured line of communication between two or more users with or without the intervention of a secured terminal, each having its own internal risk management mechanism, allowing most transactions between users, merchants, health officials, etc. to be safely conducted without accessing a central computing unit. Presently marketed examples of such devices are the Fortress U & T Ltd., Beersheva, Israel, hereinafter, Fortress SCOS+ Smart Card using the CF54A public key smart card integrated circuit, manufactured by SGS-Thomson of Rousset, France, based on a cryptoprocessor and cryptographic library designed by Fortress. This circuit uses the industry standard RSA public key encryption system for signature and secret key exchange, and the DES system for encryption.

These devices, using any of the popular public key cryptographic methods, are used as SAMs in terminals, and in smart cards. The devices control access to information, validate information, its origin, and the integrity of its contents. Using these devices in combinations, it is possible to send messages, authenticate card holders, control access to sensitive facilities, and establish a hierarchy of members of a public key cryptographic system. In such systems, it is possible to control who can do what, where the individual can do it, when, where, and in what period of time, e.g., a doctor can gain access to his computer and to a defined modem, and also be entitled to read and write in a patient's smart card to a certain class of health files, and read another class of administrative files, and be unable to read a biometric file; whereas a nurse may have very limited read access to the physician's computer, and only read access to restricted sections of a patient's health file. A biometrically activated smart card can grant an individual access to a bank's safe.

As new generation smart card memory is assumed inviolate to mutation, when programmed properly, the programs and procedures contained therein can be considered inviolate. When protected with public key cryptography, uniqueness is granted to each device, and subsequent entitlement to follow these procedures.

An explicit example of increasing the accuracy of identification and protection of confidential information is made using a commercially available computerized electrooptical device, the Digi-2, manufactured by BioMet Partners, Inc. of Murten, Switzerland, hereinafter, BioMet wherein public key cryptographic protection is augmented, using public key cryptographic smart cards and security application modules manufactured by Fortress U. & T. Ltd., Beersheva, Israel.

Amounts of biometric information which are stored vary in each of the methods in public use. Eastman Kodak vends software packages that compress individual facial data, by defining geometries and hues of facial components, allowing 60 bytes of feature coded data to suffice for reproducing a passport picture, whereas other data compression methods, not relying on computer held facial templates, utilize up to 8K bytes of memory for a well defined picture. Fingerprint data bases are known to compress feature data to from 256 bytes to 1K bytes of memory for each individual print.

The most efficient data storage methods in use involve hand and finger geometry. The commercially available ID-3D Handkey manufactured by Recognition Systems, Inc. of Campbell, Calif. (hereinafter RSI) uses a reference template of 10 bytes, whereas the Digi-2 (BioMet) has a compressed template of 20 bytes. The RSI template is the smallest in present use in biometrics (Miller).

Measures of performance in identification control schemes are now described.

A threshold value for measurement, is a gauge of acceptable proximity of a measured vector of features to a reference template of the same features. As proximity of a biotest to a template is often measured as the sum of the squared distances between measured values of sampled features in the biotest to the reference values of features in the template; for generality, a close proximity receives a smaller score, and a larger score signifies a less acceptable result. In practice, thresholds are defined, which are values above which a score is unacceptable. A tight threshold is a smaller value, typically requiring a more accurate measure, and a loose threshold is one, wherein we might expect to have a greater possibility of an impostor passing a biotest.

The accepted measures of quality in automated identification schemes are the False Acceptance and False Rejection Rates. FIGS. 9A and 9B are unscaled conceptual graphs of the relationships of these two parameters, based on data in Miller and BioMet for typical fingerprint and fingerscan biometric apparatus.

1) The False Acceptance Rate (FAR) which measures the ratio between impostors who have been granted acceptance to the total number of applicants for acceptance.

As can be seen in the graphs of FIGS. 9A and 9B, a loose threshold means that a device accepts more candidates for entry, amongst whom there may be impostors.

The false acceptance rate is typically extremely low for fingerprint scans, typically one in a million, wherein for a hand-geometry device, the false acceptance may typically be one in five hundred to a thousand, dependent on the tightness of the threshold.

2) The False Rejection Rate (FRR), which indicates the ratio between valid members of the acceptance group who have been improperly rejected by the identification system and the total number of applicants.

As can be seen in the graphs of FIGS. 9A and 9B, a loose threshold means that an increasingly large subgroup of candidates are accepted for entry, and therefore few valid members of the group are improperly rejected. Amongst those that the device did not reject, are most of those who should have been rejected.

In a fingerprint scan device, the FRR rate is typically extremely high, as many classes of people, have unclear fingerprints, whereas those whose fingerprints were clear, are accepted with a very high degree of certainty. Here it is to be expected that the high FRR rate will reject about 3% of the populace, in an experienced accurate system. Accuracy improves as users learn to comply with biometric systems'constraints, and the reference measure also typically improves, slowly, to sense the migration of measured features.

The FRR of a finger or hand geometry device is typically one fifteenth of the fingerprint scan device.

The Crossover Point is the junction of the FAR and FRR graphs. As can be seen in these figures, the finger or hand geometry devices have the most balanced FARs and FRRs, as the crossover point where the two graphs meet is near to the desired threshold. From this it can be seen that for general usage, it is preferable to resort to adaptive means to update our reference templates.

Intuitively, it is understood that there can be no one device which is best for all purposes.

In FIG. 9A, two typical proximity thresholds, 100 and 200, which are represented by horizontal broken lines, are depicted for a Digi-2 finger geometry identification device. For the instance of a Digi-2 biometric sampling, wherein an impostor is not likely to take a one in one thousand chance of attempting to deferred the system in a monitored environment, a FAR threshold of 100 would be reasonable off the system managers can accommodate for one in 500 false rejections (FARs).

However, if, as in the case of an amusement park, a person is merely being linked to a low value period (e.g. a week's pass), the possible gain is weighed against the embarrassment of being apprehended, and a looser threshold of 200 typically suffices to fend off potential cheats.

FIG. 9A is compared to FIG. 9B, which is a typical graph of a fingerprint scanner. Here the changes in the threshold value have little effect on the outcome of a biotest. If an individual is accepted by the biotest, it is clear that there is only a one in one million chance of an impostor passing the test. This is because the potential impostor would, in all probability, not agree to submit himself to the danger of being apprehended.

However, about 3 percent of the population would be rejected, typically, regardless of the value of the threshold. In a border control environment, this would mean that the guards would typically be called upon to process about one in thirty applicants. Loosening the threshold values up to the crossover point serves to cause both an FAR and an FRR of over 2%.

In the graph of FIG. 9A, the crossover point is in the vicinity of the working thresholds. In the vicinity of the thresholds (100 and 200, in the illustrated embodiment), both FRR and FAR are of the same order of magnitude and the system is balanced. In the graph of FIG. 9B, that of the fingerprint scanner, the expected FAR is eight orders of magnitude smaller than the FRR.

Figure 6B:
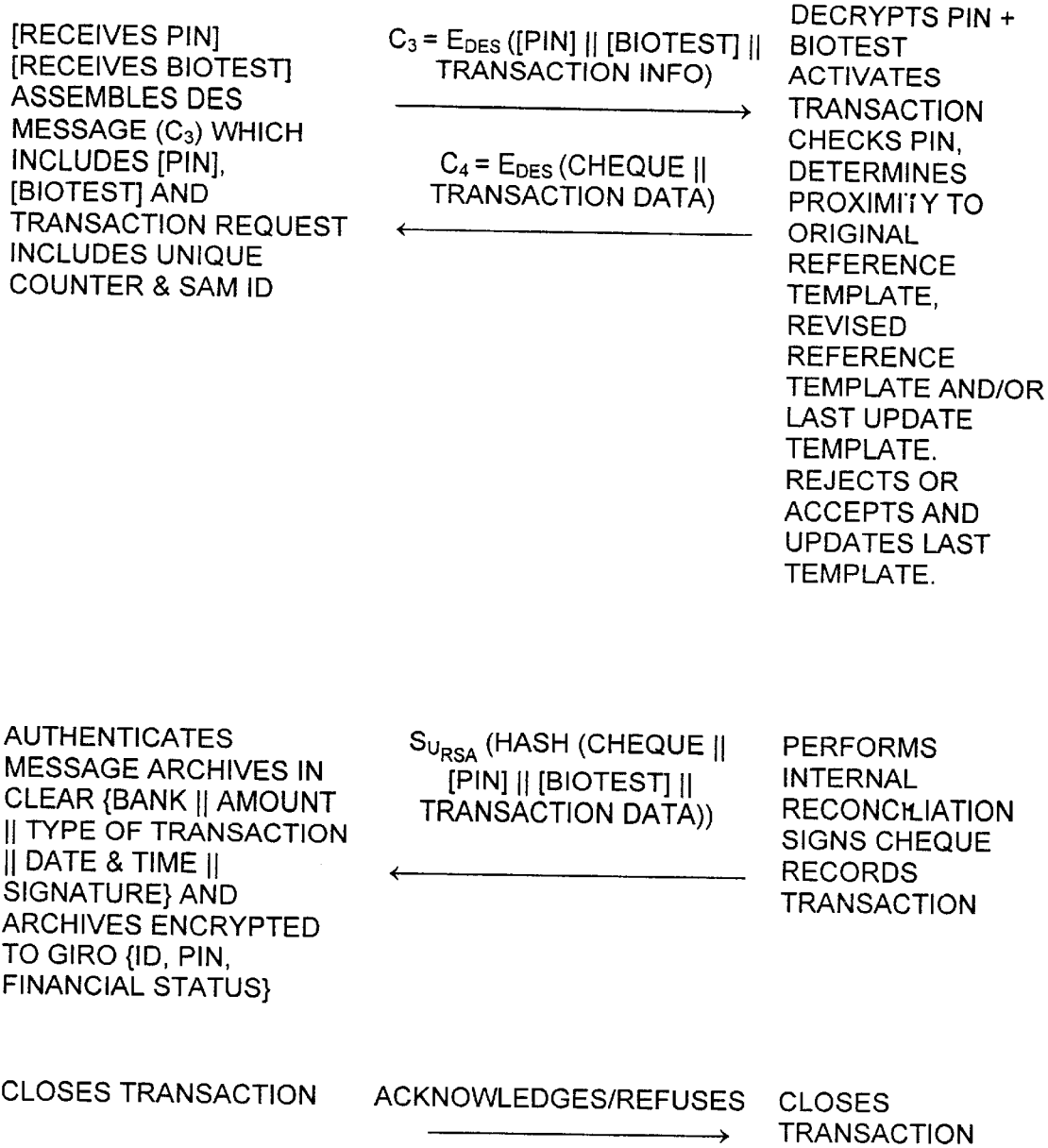
FIG. 6 is a simplified sequence-of-events illustration of a preferred method of operation for the access control system of FIG. 4 when encountering a user whose identity can be verified.
Figures 2, 10A:
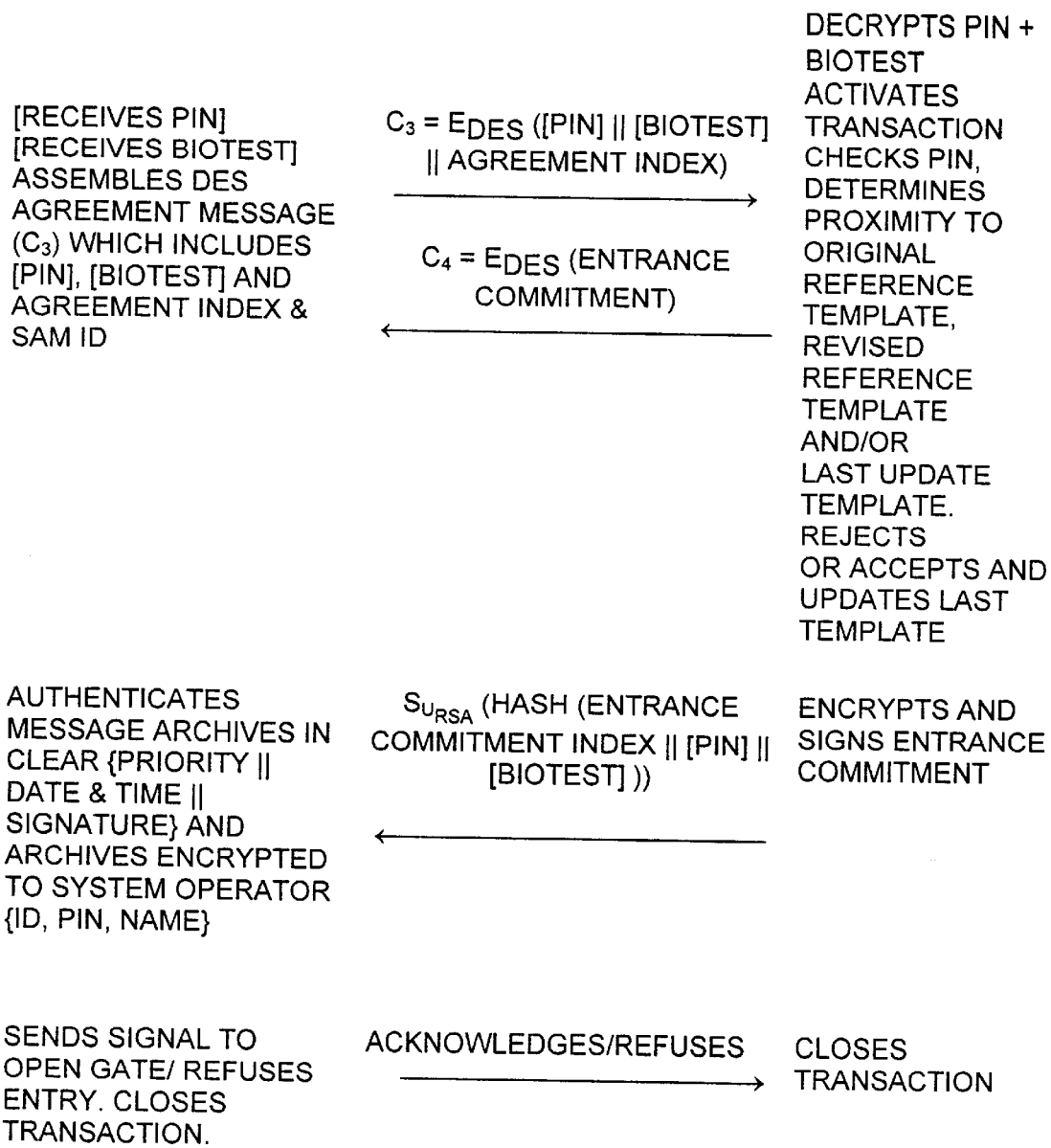

FIGS. 10A and 10B depict negotiations between a public key protected smart card terminal 450 and a smart card, wherein the goal is to gain access to a protected environment, e.g. a gate to a facility or a computer resource or procedure. The negotiation is similar to a monetary transaction, as depicted in FIGS. 6A–6B, except that no value is transferred from the smart card to the terminal, no internal electronic purses are associated with the system, and a cheque is replaced with a signed commitment to request entry.

FIG. 10A depicts a terminal in a typically poorly protected environment or in a secretive installation, where the identity of the individuals is not archived in the clear. FIG. 10B is similar to FIG. 10A, except for the final archive. In FIG. 10A, confidential data is encrypted and archived to the data acquirer. In FIG. 10B, the identity of the individuals who have gained entry is archived in the clear.

Typically, at the final stages of the negotiated transactions of FIGS. 10A–10B, the terminal SAM decrypts and authenticates the identity of the user. In FIG. 10A, the SAM encrypts the archived data for future transmission to the data acquirer. In FIG. 10B, the SAM transmits the user's identity to the terminal in the clear, where it is archived securely for transmission to the data acquirer.

The accuracies encountered in linking a person to a template of features are dependent on the strategy of the system operator and integrator and on the accuracy of the measurement of the original template, the repeatability of the measure, the quality and accuracy of calibration of the equipment, the frequency of use, and the compliance of the user in submitting to analysis. The system operator and the integrator establish, and possibly change, the threshold values defining the acceptable proximity of a measurement to the template which indicates a preferred set of values.

In most cases it is assumed that a reasonable measure of user's compliance is attained, as a user is motivated to try be positively identified to attain a goal, e.g., a purchase, entrance to a facility, etc. Therefore, the user attempts to attain a measurement which is in close proximity to the reference templates. Experience has shown operators that with continuous use, more accurate measurements are attained. In the preferred embodiment in FIGS. 5A–5B, a second stable reference template is adaptively established after a defined number of trials.

In systems where measured values migrate or oscillate, even to a slight degree, procedures for altering the template are maintained and reviewed.

Inviolate environments in the sense of this document, are bounded surroundings which are to be considered to be impenetrable by adversaries, hackers, or by the operators or users themselves.

Such necessarily guarded environments typically include:

1) Users' and Operators' Smart Cards and SAMs (security application modules) in terminal devices. These, typically, are devices wherein all secret keys and random numbers are internally generated, and all operations and commands are carried out, only when receiving proper authority from another device or authorized person to execute a verified command. It is usually assumed that an adversary can learn at great cost, the firmware of such a device, and that by physically destroying a device could manufacture a working clone of the device, without being able to extract the internally generated secrets.

2) The internal data generation output and collection environment in a biometric device, where the biotest data is classed as confidential. Biometric data in a secure system is equivalent to PIN numbers and passwords in high security systems. In the simplest examples, an adversary with a stolen smart card containing biometric data, and access to a probe in the biometric device, could activate the card, and fraudulently use it. In another instance, he might try, knowing both the measurements of a victim, and the features of a criminal, to be able to make an inflatable device, resembling the victim's biometric features, and cause the reference template to migrate from an original given template to the criminal's template, typically using an ill-begotten biometric device.

3) The enrollment computer, where users are registered into the system, with the biometric initiating device, and the entrusted and verified enrollment operator's personal identifiers. Typically, the difficulty encountered in a high security well made enrollment scheme is the dependence on the enrollment officer who must positively identify users, and his decision regime for linking a person to the identity stored previously in the individual's smart card, or in the system's data base.

4) The smart card issuer and certifier's environment. In a preferred embodiment, typically, the robustness of the total system rests on the security of these devices, and the strength of their cryptographic signature keys. These issuers and certifier's who may typically be the same entities activate and issue smart cards with the ability to be recognized and enrolled in any subsystem.

In preferred information systems, with a long life expectancy, security is not dependent on proprietary secret methods of transactions and testing, as it is to be assumed that system protocols and shared system secrets can be compromised by rogues, hackers and disgruntled employees. A shared secret, typically, is a conventional symmetrical encryption/decryption key used by terminals and users throughout an entire system.

In FIG. 3, is depicted the simplified structure of a public key protected biometric data file, with which entity has authorization to command the smart card to alter (write into the file). All authorization is proven to the smart card by the command sender using public key protection methods.

The application is typically defined by either the issuer or a subissuer, authorized by the primary issuer of the smart card. In some instances, the enrolling device may also be the primary issuing device.

The original measured template is the template which is registered as per the decision of the enrolling operator. Preferably, the candidate is first positively identified by the enrolling operator, before being allowed to submit to the biotest. Upon successful completion of the biotest, the user's biometric features are encoded into the smart card. Typically, this value is only read by the smart card application.

The original template threshold value is a parameter which is typically determined by the system application owner, depending on the application. Typically, an initial value is larger than the threshold value in a user's smart card as a result of hundreds of biotests to which the user has been submitted.

Typically, the thresholds and the templates can only be read by the smart card application. A risk management procedure of what information the card can transmit to the terminal is set in the application by the application issuer.

The revised reference template is an optional second reference template, which is intended to replace the original template after a period of system adjustment. It is well known that users learn to comply with how to submit themselves to the biotesting, and possibly intuitively change the attributes, during the first phase of use. This reference template is intended as a learning matrix, to be changed slightly at each biotest, assuming that the template accuracy improves over the first stages of use.

The revised reference threshold value is a second preferably smaller threshold, to be used when comparing measured values to the revised reference template.

It is preferable to compare the last measurement both to the last updated template 390 and to either the original enrollment template or to the revised reference template 360. Typically, the last updated template 380 has a value reasonable close to the present measured value and the revised reference template 370 is typically an enhanced version of the original template 310.

The proximity of the present measured value to the enrollment template is therefore typically a measure of migration of attributes from natural causes, and threshold 370 is typically larger than original template threshold value 320. The proximity of the measurement to the last updated template is less than the last template threshold value 390. The application officer, whose identity would be registered in field 420, is typically qualified to adjust the last template threshold value 390 when appropriate, so as not to penalize individuals with natural disorders.

The last date that a template was revised, as stored in field 400, can serve as a measure of quality of the last revised template. Typically, this can be read by a terminal, and have an effect on a threshold value.

The biocounter 410 is incremented at every biotest. Typically, as in FIGS. 5A–5B, this can define when the original reference template 310 can be replaced by a revised template 360 which is typically assumed to be more accurate.

Risk management in the card may typically determine a maximum number of biotest rejections before locking an application, prior to a reenrolling procedure.

It is anticipated that in many applications where individuals may have chronic illnesses e.g., severe arthritis, or particularly large oscillating changes, e.g., marked dimensional changes due to monthly menstruation, that looser thresholds can be authorized. Other applications involving a more homogeneous population, with more stationary attributes, and abilities to comply with a system, may demand users with tighter threshold values, e.g., fighter pilots accessing restricted facilities. In all such cases, the application officer is typically identified with an ID number 420 in the smart card. Typically, this is read by the SAM of the terminal.

Other typical additional or alternate attributes which can contribute to an improved risk management procedure are, the best score attained by the individual, a period of validity of the biodata, a level of confidence granted the individual at enrollment or card issue relevant to the quality of identification, e.g., driver's license photo, personal acquaintance, other biometric test, etc.

The enrollment procedure as depicted in FIGS. 2A–2B and executed in a system setup as conceptually described in FIGS. 1A and 1B, is basic to establishing a firm link between an individual, his attributes, and the individual's smart card.

Access to the enrollment program 10, the computer which executes the program and the biometric system is typically granted only to an enrollment operator 27, who can prove his identity with a smart card 25, and by submitting himself to the same biotest, as per a public key hierarchical procedure, where the application issuer has entitled such enroller for a limited period of time with the rights to activate the system and enroll users.

The enroller, typically, is of sound character, carefully chosen, and able to make sound decision as to the identity of a candidate. The enroller 27, typically is aware of the responsibility which he carries, and is aware that his identity is immutably programmed into the user's smart card 50, and that he is liable to accusation of collusion, should false identification be discovered, and that this information is typically available to any system terminal and that suspect cards can be locked at any of these terminals, should the enroller's ID number 340 be placed on a suspect list.

An enrolling officer/operator's task is to positively identify a candidate against data previously written in the card, identifying attributes previously known by the officer, and all other data presented by the user-candidate, whose smart card is being authenticated by the smart card reader's SAM, and the smart card authenticates the terminal as being activated with priority entitling it to register enrolling data into the user's smart card.

Once, identified by the officer, the candidate-user submits to the biometric test, while the candidate's smart card 50, is in the reader. The biometric device 40, typically takes several closely correlated readings, before establishing an original template.

Upon completion of the biotest, the terminal transmits the data to be recorded, preferably encrypted to be recorded in the smart card's application file. The smart card acknowledges that the data has been recorded and the enroller removes the user's smart card from the smart card terminal.

In a preferred embodiment, the enrolling procedure cannot take place unless the officer's card 25, has specifically been queried by the system having been inserted into the single reader as in FIG. 1B prior to acceptance of a candidate, or as it resides in the officer's smart card terminal during the term of accepting candidates.

In a typical system, the enrolling machine is memoryless as pertaining to enrollment data. No confidential data, typically, remains in the clear, but can be archived in an encrypted form to a central repository.

Not depicted in FIGS. 1A and 1B, is an additional enhancement to insure that the enrollment officer was satisfactorily attending the biometric biotest, and that the user 45, inserted his own live body parts into the registration device. Three stationary video cameras could simultaneously capture the images of the enrollment officer, the user enrollee, and the body part that is being subject to the test. This image could then be digitized and included in the data section of a secure archive.

A method of registering a secured archive is shown in U.S. Pat. No. 5,664,107 to Gressel and Dror.

Public key systems typically are equipped with suspect listing, preferably divided into three classes: suspect users, suspect terminals, and suspect application issuers.

Typically the most important element to be secured in a biometric acquisition system is the interface between the raw data, e.g., the signals to and from a keypad or the data signals from an optical biometric device, and the SAM or smart card which is defined to process a decision from such data. As in the instance of keypads of magnetic stripe credit card acceptors, such data is typically encrypted at the source, and transmitted to a secured environment for processing. This concept is depicted in FIG. 4.

In the general scheme depicted in FIG. 6, mutual terminal and smart card transmissions are executed, authenticated, and responsibility accepted, without any data which identifies the smart card, the smart card user, or the transaction data appearing in the clear on the interface between the smart card and the terminal. Assuming that the strength of the DES procedure (typically Triple DES) is as robust as the RSA procedure, then this procedure is as strong as a similar all RSA signature procedure, wherein all data is transacted in the clear. As terminal data is processed in the terminal SAM, a strategy can be determined by the system integrator as to which data can be archived in the terminal, and which data can be encrypted for transmission to a transaction acquirer and which data can be sent in the clear.

Simplified, this is a variation of an RSA transaction, wherein a hacker's probe on the interface between the smart card and the terminal yields only the publicly known identity of the terminal. The transaction information archived in the terminal can include some or all of the transaction details, but, preferably does not include biometric information (passwords, PIN numbers, or biotests). The main time consuming overhead of a conventional RSA transaction is unchanged, as there are two parties, and two sets of transformations performed on each party's key pair, one exponentiation with the secret key and one exponentiation with the public exponent. The only additional overhead is the DES encryption of blocks of transaction data. Typically, this is less than 5% of the transaction time.

The negotiation procedure as shown in FIG. 6, typically commences with the smart card making a request to perform a transaction with a terminal SAM, complying with the given payment/transaction scheme. This request is in the clear, and does not identify the smart card or its user. Note, occasionally for clarity "terminal SAM" is specified, but more often the term "terminal" is used, where it is to be understood that all confidential information and all cryptographic functions are performed within the SAM.

The terminal returns its static identification which includes its public key, to this it concatenates a random challenge, and minimally the date and time of day. From this data, the smart card can authenticate the existence of a terminal SAM, and prepare a proper challenge to the terminal.

The smart card, which is typically the only partner to the venture which is motivated to maintain confidentiality, prepares a random number (a DES session key for the transaction session) which it includes in its message to the terminal. In the string which the smart card RSA encrypts, C1, to the terminal, using the terminal's public key, it includes a concatenation of the DES key, and a hash on its own ID, its own public key, and the challenge it received from the terminal.

The terminal knows, now, that this is a fresh message because it includes its random challenge, and now has a shared secret key which is used for data exchanges with the smart card. The terminal still knows it cannot prove the validity of the smart card.

The smart card proceeds to encrypt, C2, using the new shared DES key. It sends its RSA Public Key, its certificate, its ID and other transaction information. With this information, the Terminal SAM can now extract the user's public key and prove the user's membership and status in the cryptocommunity.

Using the shared DES key, the terminal SAM now encrypts the information which it has collected to assist the activation of the smart card and to request a signature on a general commitment or a cheque in payment of a specified value. At this stage, there is a minuscule danger that a hacker may want to know what is his biometric data. Should he be acquainted with the method, and understand the proprietary information, he would have been able to spoof every stage, up to this last one, to obtain the biotest which was performed on his subject. If such information is considered sensitive, the C3 encryption can be replaced with an RSA encryption to the smart card, using the smart card's public key. This would be much more time consuming.

The smart card now decrypts the data from the terminal and can compute the proximity of the biotest to the reference templates, compare the PIN number to the number stored in its memory, update the last reference template.

The smart card now, after performing risk management, can sign the commitment/transaction, and increment or decrement its purse, if value was transferred to or from the smart card from or to the terminal. Generally there is more data than can be included in a single signature, and the new data is transmitted encrypted with the DES key, then hashed with all the relevant transaction data, and signed, as in FIG. 6. The smart card tentatively closes the transaction. Should the transaction be interrupted, final reconciliation can be completed with the terminal, or reconciled with the issuer at a later date.

The terminal receives the data, which may include a value transfer in which case, the terminal SAM reconciles its purse and archives data as prescribed by its system.

The terminal sends an acknowledgment, and the smart card closes its transaction.

It is appreciated that the software components of the present invention may, if desired, be implemented in ROM (read-only memory) form. The software components may, generally, be implemented in hardware, if desired, using conventional techniques It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A biometric method eliciting a migrating biometric characteristic from individuals, the method comprising:

storing at least first and second templates of at least one migrating biometric characteristic for each of a population of individuals, said first template being a reference sample of an individual's biometric characteristic and said second template being initially derived from said first template; and comparing an individual's first and second templates to a fresh sample provided by the individual and, if the fresh sample is found to sufficiently resemble the first and second templates, modifying the second template to take into account differences between the reference sample and the fresh sample.

2. A biometric system eliciting a migrating biometric characteristic from individuals, the system comprising:

a biometric information repository storing at least first and second templates of at least one migrating biometric characteristic for each of a population of individuals, said first template being a reference sample of an individual's biometric characteristic and said second template being initially derived from said first template; and a repository keeper operative to compare an individual's first and second templates to a fresh sample provided by the individual and, if the fresh sample is found to sufficiently resemble the first and second templates, to modify the second template to take into account differences between the reference sample and the fresh sample.

3. A secured biometric device eliciting a biometric characteristic from individuals, the system comprising:

a biometric information repository storing a biometric information file for each of a population of individuals, each biometric information file of a particular individual comprising:

a representation of a sample of at least one biometric characteristic; and enrollment operator identification information identifying the enrollment operator who presided over elicitation of said sample from said individual.

4. A secured biometric method eliciting a biometric characteristic from individuals, the method comprising:

providing a biometric information repository;

storing, in the repository, a biometric information file for each of a population of individuals, each biometric information file of a particular individual comprising:
a representation of a sample of at least one biometric characteristic; and
enrollment operator identification information identifying the enrollment operator who presided over elicitation of said sample from said individual; and retrieving said biometric information in order to make decisions regarding the individuals.

5. A digital decision making system comprising:

a portable digital information receptacle; and an information receptacle terminal operative to carry out an interaction with the portable digital information receptacle and to make a decision based on said interaction, wherein said interaction includes a clear portion and a protected portion and wherein said clear portion includes only a declaration on the part of the terminal of its identity.

6. A system according to claim 5 wherein said protected portion includes a publicly known identity of the portable digital information receptacle.

7. A system according to claim 5 wherein said information receptacle comprises a smart card.

8. A system according to claim 5 and wherein said protected portion comprises a transfer of value from an account controlled by the information receptacle to a value destination, the transfer including a commitment of the information receptacle to the terminal that said value is to be transferred to said value destination.

9. A system according to claim 5 wherein said protected portion is protected by a symmetric cryptographic scheme and an asymmetric cryptographic scheme.

10. A system according to claim 2 wherein said biometric characteristic comprises at least one of the following:

an item of information known to an individual;

an article possessed by an individual; and a physiological feature of an individual.

11. A system according to claim 3 wherein said biometric characteristic comprises at least one of the following:

an item of information known to an individual;

an article possessed by an individual; and a physiological feature of an individual.

12. A digital decision making method comprising:

providing a portable digital information receptacle; and carrying out an interaction between the portable receptacle and an information receptacle terminal, thereby allowing the terminal to make a decision based on said interaction, wherein said interaction includes a clear portion and a protected portion and wherein said clear portion includes only a declaration on the part of the terminal of its identity.

13. A biometric system comprising:

a multiplicity of smart cards storing a multiplicity of biometric templates respectively identifying a multiplicity of persons respectively;

wherein each of the smart cards is operative to receive a biotest and to perform a decision process to determine whether the biotest should be accepted as identifying the person associated with the smart card.

14. A system according to claim 13 wherein said biotest is provided to said smart card by a terminal in encrypted form and not in the clear.

15. A system according to claim 13 wherein the smart card performs at least one of the following interactions with a terminal: transmission execution interactions, transmission authentication interactions and responsibility acceptance interactions, thereby defining an interface between the smart card and the terminal, and wherein data identifying the smart card, the person associated therewith and the interactions never appears in the clear in said interface between the smart card and the terminal.

* * * * *